(12) United States Patent
Zucchelli et al.

(10) Patent No.: US 7,031,617 B2
(45) Date of Patent: Apr. 18, 2006

(54) METHOD AND SYSTEM FOR OPTICAL WAVELENGTH CONVERSION AND REGENERATION

(75) Inventors: Libero Zucchelli, Turin (IT); Aritz Suescun Sanchez, Pamplona (ES)

(73) Assignee: Agilent Technologies, Inc., Palo Alto, CA (US)

( * ) Notice: Subject to any disclaimer, the term of this patent is extended or adjusted under 35 U.S.C. 154(b) by 679 days.

(21) Appl. No.: 10/194,552

(22) Filed: Jul. 12, 2002

(65) Prior Publication Data

US 2003/0011858 A1   Jan. 16, 2003

(30) Foreign Application Priority Data

Jul. 12, 2001  (EP)  .................................. 01116986

(51) Int. Cl.
*H04B 10/02*  (2006.01)
(52) U.S. Cl. ........................ 398/176; 398/175; 398/183
(58) Field of Classification Search ................ 398/175, 398/176, 183
See application file for complete search history.

(56) References Cited

FOREIGN PATENT DOCUMENTS

JP          08334797        12/1996

OTHER PUBLICATIONS

Kieman, L. European Search Report, Application No. EP 01 11 6986, dated Dec. 7, 2001.
Wolfson D. et al. "40-GB/S All-Optical Wavelength Conversion, Regeneration, and Demultiplexing in an SOA-Based All-Active Mach-Zehnder Interferometer," IEEE Photonics Technology Letters, New York, vol. 12, No. 3, Mar. 2000, pp. 332-334, XP000931980.
Wolson D. et al."All-Optical 2R Regeneration Based on Interferometric Structure Incorporating Semiconductor Optical Amplifiers," Electronic Letters, vol. 35, No. 1, Jan. 7, 1999, pp. 59-60, XPP000876265.
Durhuus T. et al. "All Optical Wavelength Conversion by SOA's in a Mach-Zehnder Configuration," IEEE Photonics Technology Letters, vol. 6, No. 1, 1994, pp. 53-55, XP000540019.
Jepsen K S et al. "20 GBIT/S Optical 3R Regeneration Using Polarisation-Independent Monolithically Integrated Michelson Interferometer," Electronics Letters, vol. 34, No. 5, Mar. 5, 1998, pp. 472-474, XP006009368.

*Primary Examiner*—David C. Payne

(57) ABSTRACT

An on/off switchable source of a continuous optical signal at a respective wavelength ($\lambda_2$) is provided to be turned off when the wavelength ($\lambda_1$) of the modulated incoming signal corresponds to the respective wavelength ($\lambda_2$) generated by the source while turning said source on when the wavelength ($\lambda_1$) of the incoming signal differs from the source wavelength ($\lambda_2$). A Michelson interferometer is provided adapted to receive the incoming signal and the continuous optical signal generated by the source to produce an output signal. The Michelson interferometer is adapted to give rise to destructive viz. constructive interference when the incoming signal has first and second logical values, respectively. When the wavelength ($\lambda_1$) of the incoming signal, which is not generally known a priori, corresponds to the source wavelength ($\lambda_2$), the source is switched off and the output signal is a replica of the incoming signal regenerated at the interferometer. When the wavelength ($\lambda_1$) of the incoming signal differs from the source wavelength ($\lambda_2$), the source is switched on and the output signal is a replica of the incoming signal regenerated at the interferometer and wavelength converted to the source wavelength ($\lambda_2$).

30 Claims, 1 Drawing Sheet

METHOD AND SYSTEM FOR OPTICAL WAVELENGTH CONVERSION AND REGENERATION

FIELD OF THE INVENTION

The present invention refers to wavelength conversion and regeneration of optical signals and, more specifically, to wavelength conversion and regeneration of incoming optical signals carrying data i.e. optical signals modulated to have at least first and second logical values.

BACKGROUND OF THE INVENTION

Solutions are known in the art permitting wavelength conversion and regeneration of optical signals by using interferometers.

For instance, Mach Zehnder Interferometer All Optical Wavelength Converters (MZI-AOWC) are known based on a counter-propagating configuration. Also, Michelson Interferometer All Optical Wavelength Converters (MI-AOWC) are known. These are generally simpler than MZI-AOWC whose counter-propagating configuration is also responsible for appreciable limitations in terms of bandwidth in comparison with solutions based on the use of Michelson Interferometers (MI).

For instance, from L. Zucchelli et al., "System assessment of a compact monolithic Michelson interferometer wavelength converter", European Conference on Integrated Optics, ECIO'99, 14–16, Apr. 1999—Turin (Italy), pp. 479–482 a Michelson interferometer is known including passive optical waveguides forming a 50:50 optical coupler monolithically integrated with two Semiconductor Optical Amplifiers (SOA's). Specifically, wavelength conversion and 2R (Reshaping-Reamplification) regeneration is disclosed in connection with incoming data which are directly fed to one of the two SOA's, while the local signal enters the device from one of the passive waveguides. If the input signal (whose wavelength is not known a priori) happens to have the same wavelength desired at the output, conversion is not possible since the local signal and the incoming data cannot be separated.

Use of a substantially similar device as a data regenerator is also demonstrated in D. Wolfson et al., "All-optical 2R regeneration based on interferometric structure incorporating semiconductor optical amplifiers", Electronics Letters, 7, Jan. 1999, vol. 35, no. 1. There, the two SOA's are polarised at two different working points, the data enter the device through passive ports and, thanks to the non-linear characteristic of the device, regeneration is effected without however making it possible to obtain wavelength conversion.

SUMMARY OF THE INVENTION

The object of the present invention is thus providing a solution which enables full optical regeneration of an input signal while also permitting, if necessary, simultaneous conversion to a different wavelength.

According to the present invention, such an object is achieved by means of a method as set forth in the annexed claims. The invention also relates to the corresponding system.

DETAILED DESCRIPTION OF THE PREFERRED EMBODIMENTS

Figure 1:
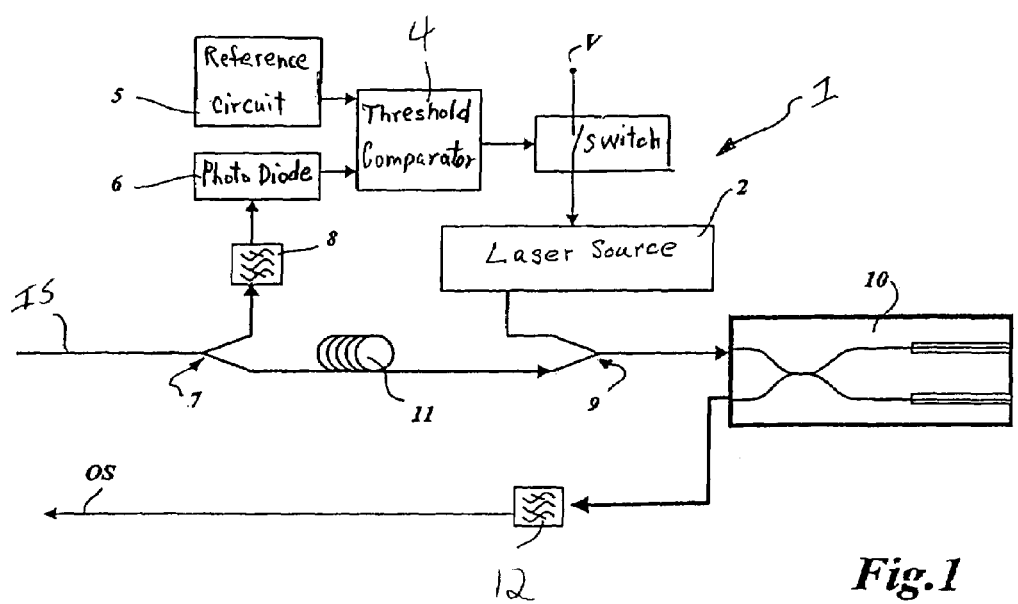
FIG. 1 is a a block diagram of the system according to the present invention.

The invention will now be described, by way of example only, with reference to the annexed drawing including a single FIGURE, designated FIG. 1, showing a block diagram of a system according to the invention.

In the annexed drawing, reference numeral 1 designates overall a system for wavelength conversion and regeneration of an incoming optical signal IS at a given wavelength $\lambda_1$. Incoming signal IS is a data carrying signal modulated to have at least first and second logical values. In the following it will be generally assumed that incoming signal IS is modulated to have first and second logical values corresponding to logical "0" and "1" values, respectively.

System 1 generates an output signal OS which is a replica of incoming signal IS (i.e. a signal carrying the same data as incoming signal IS). Also, output signal OS is a regenerated replica of incoming signal IS, and more to the point the result of 2R (Reshaping-Reamplification) regeneration of incoming signal IS.

Output signal OS is a modulated optical signal at a respective wavelength $\lambda_2$ either corresponding (i.e. identical or substantially identical) to $\lambda_1$ or being different therefrom. In this latter case system 1 also acts as wavelength converter.

As indicated, in most applications envisaged the actual value of $\lambda_1$ is not generally known a priori.

In the block diagram of FIG. 1 reference 2 designates a source of an optical signal at the desired output wavelength $\lambda_2$. Preferably, source 2 is comprised of a tunable laser source of a type currently known in the art.

Specifically, laser source 2 is on/off switchable source of a continuous optical signal at wavelength $\lambda_2$ acting under the control of an on/off switch 3 of a known type (e.g. semiconductor switch, e.g. based on transistor or FET technology). Switch 3 controls feeding of a power supply voltage V to laser source 2, in such a way that when laser source 2 is turned off, no appreciable amount of optical signal is available at the output of the source 2. Conversely, when source 2 is turned on, a continuous unmodulated optical signal at wavelength $\lambda_2$ is generated by source 2.

Reference numeral 4 designates a threshold comparator having two inputs. These include an inverting input, which is kept at a given threshold value generated by a reference circuit 5, as well as a non-inverting input, which is fed with an electric signal generated by a photodiode 6.

A portion of incoming signal IS is split at 7 (e.g. by means of a fiber beam splitter of a type known in the art) to be fed to an optical filter 8 having a selective bandpass characteristic centered at wavelength $\lambda_2$. Filter 8 is preferably in the form of tunable optical filter of a type currently known in the art.

The arrangement of elements 2 to 8 is such that, if the wavelength $\lambda_1$ of incoming signal IS corresponds to $\lambda_2$, the portion of incoming signal IS split at 7 passes through filter 8 to impinge onto photodiode 6 cascaded thereto. High optical power is thus revealed at photodiode 6 to give rise to an output signal of photodiode 6 which is higher than the threshold of comparator 4 set by reference circuit 5.

A signal is thus generated at the output of comparator 4 which acts on switch 3 such a way that laser source 2 is turned off.

Consequently, when incoming signal IS is at a wavelength $\lambda_1 = \lambda_2$ no signal is derived from source 2.

Conversely, if incoming signal IS is at a wavelength $\lambda_1$ which differs from $\lambda_2$, the portion of incoming signal IS split at 7 is blocked by filter 8. Under these circumstances, the output signal from photodiode 6 is practically nil or, in any case lower than the threshold value set by reference circuit 5. The output signal from comparator 4 is low, which in turn causes switch 3 to be closed thus causing supply voltage V to be fed to source 2. As a result, when incoming signal IS is at wavelength $\lambda_1$ different from $\lambda_2$ an optical signal at wavelength $\lambda_2$ is derived from source 2.

Reference numeral 9 designates an optical coupler of a known type adapted to combine:

the (largely prevailing) portion of incoming signal IS which is not split at 7 to be fed to filter 8, and the optical signal generated by source 2 when these latter is activated (i.e. turned on).

Most obviously, when source 2 is turned off, no respective optical signal is present and coupler 9 is simply traversed by the portion of incoming signal IS propagated from splitter 7.

The signal from coupler 9 is fed to a Michelson interferometer 10 of a known type (see for instance the article by L. Zucchelli et al. referred to in the introductory portion of the description).

It will be appreciated that propagation of incoming signal IS from splitter 7 to coupler 9 takes place through a delay line 11 (typically comprised of a length of optical fiber) in order to ensure that modulation of incoming signal IS which is fed to coupler 9 is properly timed with the signal possibly generated by source 2. Even though being continuous by its nature, the signal generated by source 2 is in fact subject to the "modulation" effect due to source 2 being turned on and off by switch 3. Stated otherwise, delay line 11 is intended to compensate any delay possibly introduced by the processing chain comprised of elements designated 2 to 6 and 8.

Also, the output signal from interferometer 10 is passed through an output bandpass filter 12 centered at $\lambda_2$ thus suppressing any signal component at a wavelength different from $\lambda_2$ at the output from interferometer 10.

If the wavelength $\lambda_1$ of incoming signal IS corresponds to $\lambda_1$, laser source 2 is turned off and interferometer 10 is in fact fed exclusively with the portion of incoming signal IS propagated through beam splitter 7, fiber 11 and coupler 9.

In that case, interferometer 10 operates essentially in the same way as disclosed in the article by D. Wolfson et al. referred to in the introductory portion of the description. Output signal OS is thus a 2R (Reshaped-Reamplified) regenerated replica of incoming signal IS at wavelength $\lambda_1(=\lambda_2)$.

If incoming signal IS is at a wavelength $\lambda_1$ different from $\lambda_2$, interferometer 10 is fed with the combined signal obtained at coupler 9 comprising the portion of incoming signal IS—at wavelength $\lambda_1$—propagated through beam splitter 7 and fiber 11 as well as the continuous signal—at wavelength $\lambda_2$—derived from source 2.

The data carried by incoming signal IS at wavelength $\lambda_1$ will change differently the refractive index of the two SOA's of interferometer 10. The continuous signal at wavelength $\lambda_2$ generated by source 2 will thus give rise to destructive interference in correspondence with logical "zeros" (i.e. the first logical value) of incoming signal IS while giving rise to constructive interference in correspondence with logical "ones" (i.e. the second logical value) of incoming signal IS.

Under these circumstances, output signal OS is a regenerated replica of incoming signal IS, which was further subject to wavelength conversion (from $\lambda_1$ to $\lambda_2$) as a result of interference in interferometer 10.

The principles of the invention remaining the same, the details of construction and the embodiments may widely vary with respect to what has been described and illustrated purely by way of example. For instance, the annexed drawing shows two separate ports of interferometer 10 being used for feeding the signal from coupler 9 to interferometer 10 and for extracting from interferometer 10 output signal OS, respectively. An alternative arrangement could however be resorted to as shown e.g. in the article by D. Wolfson et al. already referred to in the foregoing: there, a single port of interferometer 10 is used for both purposes by resorting to a circulator or an additional coupler. As a further example, in the place of passive optical waveguides, interferometer 10 could include waveguides, preferably of the curved type, adapted to produce amplification of the radiation propagated.

Also, it will be appreciated that "switching off" laser source 2, that is the source of optical signal at wavelength $\lambda_2$, does not necessarily require the optical signal at the output of such source to be completely extinguished. In an alternative embodiment of the invention with respect to the embodiment described in detail in the foregoing, source 2 may include a tunable source (of a known type) adapted to be selectively tuned i.e. switched—depending on the output signal from comparator 4—between output wavelength $\lambda_2$ and another wavelength $\lambda_3$ selected to be different from $\lambda_2$. While propagated through coupler 9 and interferometer 10, such wavelength $\lambda_3$ will in any case be blocked by filter 12 (such filter being possibly adapted to be dispensed with if wavelength $\lambda_3$ is selected to be remote from $\lambda_2$).

Under these operating conditions source 2 will have no effect on output signal OS and will in fact be "turned off" in so far as output signal OS is concerned.

Such alternative embodiment of the on/off switchable source of the invention may be advantageous in certain applications since the optical power injected into interferometer 10 will remain essentially the same. This irrespective of whether source 2 is turned (that is tuned) "on" to produce radiation at wavelength $\lambda_2$ or "off" to produce radiation at wavelength $\lambda_3$ expected to be filtered out at 12, thus having no effect on output signal OS. Interferometer 10 receiving a substantially constant input optical power irrespective of the different operating conditions, namely $\lambda_1$ being identical or different from $\lambda_2$, may facilitate proper biasing of the Semiconductor Optical Amplifiers (SOAs) included in the interferometer. Also, in at least some possible embodiments of source 2, on/off switching by selectively switching the source between two different emission wavelengths $\lambda_2$ and $\lambda_3$ gives rise to easier implementation of the related circuitry in comparison to a switch intended to completely extinguish the output radiation from source 2 in the "off" state as is the case of switch 3 described in the foregoing.

Still other possible variants of the invention may thus be devised without departing from the scope of the present invention as defined by the annexed claims.

The invention claimed is:

1. A method for the wavelength conversion and regeneration of an optical signal at a given wavelength ($\lambda_1$), said optical signal being modulated to have at least first and second logical values, the method comprising the steps of:

providing a switchable source of a further optical signal at a respective wavelength ($\lambda_2$), selectively switching said source to generate said further optical signal at said respective wavelength ($\lambda_2$) when said given wavelength ($\lambda_1$) differs from said respective wavelength ($\lambda_2$), providing an interferometer for producing an output signal, said interferometer being adapted to receive said modulated optical signal and said further optical signal at said respective wavelength ($\lambda_2$) generated by said source, so that said further optical signal generated by said source gives rise to destructive interference when said modulated optical signal has said first logical value and constructive interference when said modulated optical signal has said second logical value, respectively, whereby:

when said given wavelength ($\lambda_1$) corresponds to said respective wavelength ($\lambda_2$), said output signal is a replica of said modulated optical signal regenerated at said interferometer, and when said given wavelength ($\lambda_1$) differs from said respective wavelength ($\lambda_2$), said output signal is a replica of said modulated signal regenerated at said interferometer, said replica being also wavelength converted to said respective wavelength ($\lambda_2$).

2. The method of claim 1, further comprising: filtering out at the output of said interferometer any component of said output signal at a wavelength different from said respective wavelength ($\lambda_2$).

3. The method of claim 1 further comprising:
providing a selective filter sensitive to said respective wavelength ($\lambda_2$),
feeding at least a portion of said modulated optical signal to said selective filter to generate a switch control signal having different values when said given wavelength ($\lambda_1$) corresponds to said respective wavelength ($\lambda_2$) and when said given wavelength ($\lambda_1$) differs from said respective wavelength ($\lambda_2$), respectively, and
using said switch control signal to control switching of said source.

4. The method of claim 3, further comprising: generating said switch control signal by means of opto-electrical conversion at the output of said selective filter.

5. The method of claim 3 further comprising: comparing said switch control signal against a reference threshold, the result of comparison of said switch control signal and said reference threshold being used to control switching of said source.

6. The method of claim 1 further comprising: selecting said interferometer as a Michelson interferometer.

7. The method of claim 6, wherein said Michelson interferometer includes passive optical waveguides forming an optical coupler.

8. The method of claim 7, wherein said optical waveguides form a 50:50 optical coupler.

9. The method of claim 6, wherein said interferometer includes semiconductor optical amplifiers.

10. The method of claim 1 further comprising:
splitting a portion of said modulated signal to control switching of said source thus generating a remaining portion of said modulated signal,
propagating said remaining portion of said modulated signal towards said interferometer, and
coupling upstream of said interferometer said remaining portion of the said modulated signal with said further optical signal generated by said source when said source is turned on.

11. The method of claim 10, further comprising: delaying said remaining portion of said modulated signal while being propagated toward said interferometer.

12. The method of claim 1, wherein said source is selected as a source of a continuous optical signal at said respective wavelength ($\lambda_2$).

13. The method of claim 1, further comprising: selectively switching said source to extinguish the output optical signal therefrom when said given wavelength ($\lambda_1$) corresponds to said respective wavelength ($\lambda_2$).

14. The method of claim 1, further comprising: selectively switching said source to generate an output optical signal at a further respective wavelength ($\lambda_3$) when said given wavelength ($\lambda_1$) corresponds to said respective wavelength ($\lambda_2$), said further respective wavelength ($\lambda_3$) being different from said respective wavelength ($\lambda_2$); the arrangement being such that said interferometer is fed with optical signal irrespective when said given wavelength ($\lambda_1$) corresponds to said respective wavelength ($\lambda_2$) and when said given wavelength ($\lambda_1$) differs from said respective wavelength ($\lambda_2$).

15. The method of claim 14, further comprising filtering out at the output of said interferometer any component of said output signal at a wavelength different from said respective wavelength ($\lambda_2$).

16. A system for the wavelength conversion and regeneration of an optical signal at a given wavelength ($\lambda_1$), said optical signal being modulated to have at least first and second logical values, the system comprising:
an switchable source of a further optical signal at a respective wavelength ($\lambda_2$),
a switch element for selectively switching said source to generate said further optical signal at said respective wavelength ($\lambda_2$) when said given wavelength ($\lambda_1$) differs from said respective wavelength ($\lambda_2$),
an interferometer for producing an output signal, said interferometer being adapted to receive said modulated optical signal and said further optical signal at said respective wavelength ($\lambda_2$) generated by said source, so that said further optical signal generated by said source is adapted to give rise to destructive interference when said modulated optical signal has said first logical value and to give rise to constructive interference when said modulated optical signal has said second logical value, the arrangement being such that:
when said given wavelength ($\lambda_1$) corresponds to said respective wavelength ($\lambda_2$), said output signal is a replica of said modulated optical signal regenerated at said interferometer, and
when said given wavelength ($\lambda_1$) differs from said respective wavelength ($\lambda_2$), said output signal is a replica of said modulated signal regenerated at said interferometer, said replica being also wavelength converted to said respective wavelength ($\lambda_2$).

17. The system of claim 16, further comprising an output filter for filtering out at the output of the said interferometer any component of said output signal at a wavelength different from said respective wavelength ($\lambda_2$).

18. The system of claim 16, further comprising a selective filter sensitive to said respective wavelength ($\lambda_2$) for receiving at least a portion of said modulated optical signal for generating a switch control signal for controlling switching on and off of said source, said switch control signal having different values when said given wavelength ($\lambda_1$) corresponds to said respective wavelength ($\lambda_2$) and when said given wavelength ($\lambda_1$) differs from said respective wavelength ($\lambda_2$), respectively.

19. The system of claim 18, further comprising a photodiode cascaded to said selective filter to generate said switch control signal.

20. The system of claim 18 further comprising a comparator for comparing said switch control signal against a reference threshold the result of comparison of said switch control signal and said reference threshold being used to control said switch element to switch said source.

21. The system of claim 16, wherein said interferometer is a Michelson interferometer.

22. The system of claim 21, wherein said Michelson interferometer includes passive optical waveguides forming an optical coupler.

23. The system of claim 22, wherein said optical waveguides form a 50:50 optical coupler.

24. The system of claim 21, wherein said interferometer includes semiconductor optical amplifiers.

25. The system of claim 16 further comprising:
a splitter element for splitting a portion of said modulated signal to control switching of said source thus generating a remaining portion of said modulated signal,
a propagation line for propagating said remaining portion towards said interferometer, and
a coupler arranged upstream of said interferometer for coupling said remaining portion of the said modulated signal with said further optical signal regenerated by said source when said source is turned on.

26. The system of claim 25, wherein said propagation line is arranged for delaying said remaining portion of said modulated signal while being propagated towards said interferometer.

27. The system of claim 16, wherein said source is a source of a continuous optical signal at said respective wavelength ($\lambda_2$).

28. The system of claim 16, wherein said switch element is arranged to selectively switch said source to extinguish the output optical signal therefrom when said given wavelength ($\lambda_1$) corresponds to said respective wavelength ($\lambda_2$).

29. The system of claim 16, wherein said switch element is arranged to selectively switch said source to generate an output optical signal at a further respective wavelength ($\lambda_3$) when said given wavelength ($\lambda_1$) corresponds to said respective wavelength ($\lambda_2$), said further respective wavelength ($\lambda_3$) being different from said respective wavelength ($\lambda_2$); the arrangement being such that said interferometer is fed with optical signal irrespective when said given wavelength ($\lambda_1$) corresponds to said respective wavelength ($\lambda_2$) and when said given wavelength ($\lambda_1$) differs from said respective wavelength ($\lambda_2$).

30. The system of claim 29, further comprising a filter for filtering out at the output of said interferometer any component of said output signal at a wavelength different from said respective wavelength ($\lambda_2$).

* * * * *